(12) United States Patent
Lotter et al.

(10) Patent No.: US 10,136,335 B2
(45) Date of Patent: Nov. 20, 2018

(54) INTEGRATED REPEATER

(71) Applicant: Nextivity, Inc., San Diego, CA (US)

(72) Inventors: Michiel Petrus Lotter, San Diego, CA (US); InKwang Kim, San Diego, CA (US); Jason Foster Cook, Huntington Beach, CA (US)

(73) Assignee: Nextivity, Inc., San Diego, CA (US)

( * ) Notice: Subject to any disclaimer, the term of this patent is extended or adjusted under 35 U.S.C. 154(b) by 0 days.

(21) Appl. No.: 15/966,624

(22) Filed: Apr. 30, 2018

(65) Prior Publication Data
US 2018/0249347 A1    Aug. 30, 2018

Related U.S. Application Data

(63) Continuation of application No. 14/705,810, filed on May 6, 2015, now Pat. No. 9,961,561.

(60) Provisional application No. 61/989,379, filed on May 6, 2014.

(51) Int. Cl.
H04W 16/26 (2009.01)
H01Q 1/24 (2006.01)
H01Q 1/52 (2006.01)
H01Q 21/28 (2006.01)
H04W 16/28 (2009.01)
H04B 7/155 (2006.01)

(52) U.S. Cl.
CPC ............ *H04W 16/26* (2013.01); *H01Q 1/246* (2013.01); *H01Q 1/521* (2013.01); *H01Q 21/28* (2013.01); *H04B 7/155* (2013.01); *H04B 7/15507* (2013.01); *H04W 16/28* (2013.01)

(58) Field of Classification Search
CPC ............................... H01Q 1/246; H01Q 1/521
USPC ......... 455/11.1, 13.114, 15, 16, 446, 24, 25, 455/562.1, 63.1; 343/702, 824
See application file for complete search history.

Primary Examiner — Cong Tran
(74) Attorney, Agent, or Firm — Mintz Levin Cohn Ferris Glovsky and Popeo, P.C.

(57) ABSTRACT

An integrated repeater is provided that places a donor antenna and a server antenna proximate to null-field points from the server antenna and the donor antenna, respectively, thereby increasing the isolation level between the donor antenna and the server antenna.

19 Claims, 5 Drawing Sheets

INTEGRATED REPEATER

CROSS-REFERENCE TO RELATED APPLICATIONS

This application claims priority to and the benefit of U.S. Non-Provisional application Ser. No. 14/705,810, filed May 6, 2015, which claims priority to and the benefit of U.S. Provisional Application No. 61/989,379, filed May 6, 2014, which are incorporated herein by reference in their entirety.

TECHNICAL FIELD

The subject matter described herein relates to wireless networks, and more particularly to an improved integrated repeater that maximizes the isolation between a donor antenna and a server antenna by placing the server antenna in a physical location where the donor antenna has a transmission null and/or vice-versa.

BACKGROUND

The gain of a repeater is to a large extent determined by the amount of isolation that can be achieved between the donor and server antennas of the repeater (see diagram 100 of FIG. 1). The higher the isolation, the higher the potential gain of the repeater.

When the donor and server antennas are in the same physical enclosure, or at least in close proximity to each other, maximizing the isolation level becomes increasingly difficult. Typically, repeaters with integrated donor and server antennas utilize highly directive antennas on either the donor or the server side, or more commonly on both the donor and the server side to achieve high isolation. An example of a commonly used architecture is to use directive patch antennas on a large ground plane to provide high isolation levels. When the operating frequency of the repeater is high (around 2 GHz and higher), this is a reasonably good strategy as the wavelength of the signals is relatively short. However, at lower frequencies, such as the 3GPP bands 5 and 12 (700-900 MHz), the wavelength of the repeated signal is long (300-400 mm) which means that the physical size of a patch antenna and ground plane needs to be large to achieve high isolation.

SUMMARY

In one aspect, an integrated repeater is disclosed that maximizes the isolation between a donor antenna and the server antenna by placing the server antenna in a physical location where the donor antenna has a transmission null and/or vice-versa.

The integrated repeater may comprise a repeater housing. The integrated repeater may comprise a donor antenna. The donor antenna may be disposed within the repeater housing. The donor antenna may be configured to transmit and/or receive a wireless signal from a base station. The donor antenna may be configured to emit a transmission field having one or more null-field points.

The integrated repeater may comprise a server antenna. The server antenna may be disposed within the repeater housing. The server antenna may be physically separated from the donor antenna. The server antenna may be configured to transmit and/or receive a wireless signal from one or more wireless devices. The server antenna may be disposed proximate to a location of at least one of the one or more null-field points of the transmission field from the donor antenna. The serer antenna may be disposed as such for signal isolation between the server antenna and the donor antenna.

In some implementations, a plurality of donor antennas may be disposed within the repeater housing. The donor antennas may emit one or more transmission fields that have a plurality of null-field points within the repeater housing. A plurality of server antennas may be disposed within the repeater housing. Individual ones of the plurality of server antennas may be disposed proximate to individual ones of the plurality of null-field points within the repeater housing.

The one or more donor antennas and/or the one or more server antennas may be dipole antennas, multiband antennas and/or other forms of antennas.

In some variation, at least one of the one or more null-field points of the signals emitted from the donor antenna and/or the server antenna may be aligned with the repeater housing.

In some variations, the signals transmitted by the donor antenna and/or the server antenna are orthogonally polarized. The orthogonally polarized signals transmitted by the donor antenna may be orthogonal to the orthogonally polarized signals transmitted by the server antenna.

In another aspect, a method of configuring an integrated repeater is described. The method may include providing a donor antenna. The donor antenna configured to transmit and/or receive a wireless signal from a base station. The donor antenna may emit a signal having one or more null-field points.

The method may include providing a server antenna. The server antenna may be configured to transmit and/or receive a wireless signal from one or more wireless devices. The server antenna may emit a signal having one or more null-field points.

The position of at least one of the one or more null-field points of the signal emitted from the donor antenna may be determined. The positon of at least one of the one or more null-field points of the signal emitted from the server antenna may be determined.

The donor antenna may be positioned proximate to at least one of the one or more null-field points of the signal emitted from the server antenna. The server antenna may be positioned proximate to at least one of the one or more null-field points of the signal emitted from the donor antenna.

The method may include determining the dimensions of a repeater housing. The dimensions of the repeater housing may be based on a requirement that at least one of the positions of the one or more null-field points of the signal emitted by the donor antenna and at least one of the positions of the one or more null-field points of the signal emitted by the server antenna are within the repeater housing when the donor antenna and the server antenna are disposed in the repeater housing. The dimensions of the repeater housing may be based on having at least one of the one or more null-field points of the signals emitted from the donor antenna and/or the server antenna being aligned with the repeater housing.

Implementations of the current subject matter can include, but are not limited to, systems and methods consistent including one or more features are described as well as articles that comprise a tangibly embodied machine-readable medium operable to cause one or more machines (e.g., computers, mobile communication devices, etc.) to result in operations described herein. Similarly, computer systems are also described that may include one or more processors and one or more memories coupled to the one or more processors. A memory, which can include a computerreadable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claim. While certain features of the currently disclosed subject matter are described for illustrative purposes in relation to an enterprise resource software system or other business software solution or architecture, it should be readily understood that such features are not intended to be limiting. The claim that follows this disclosure is intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
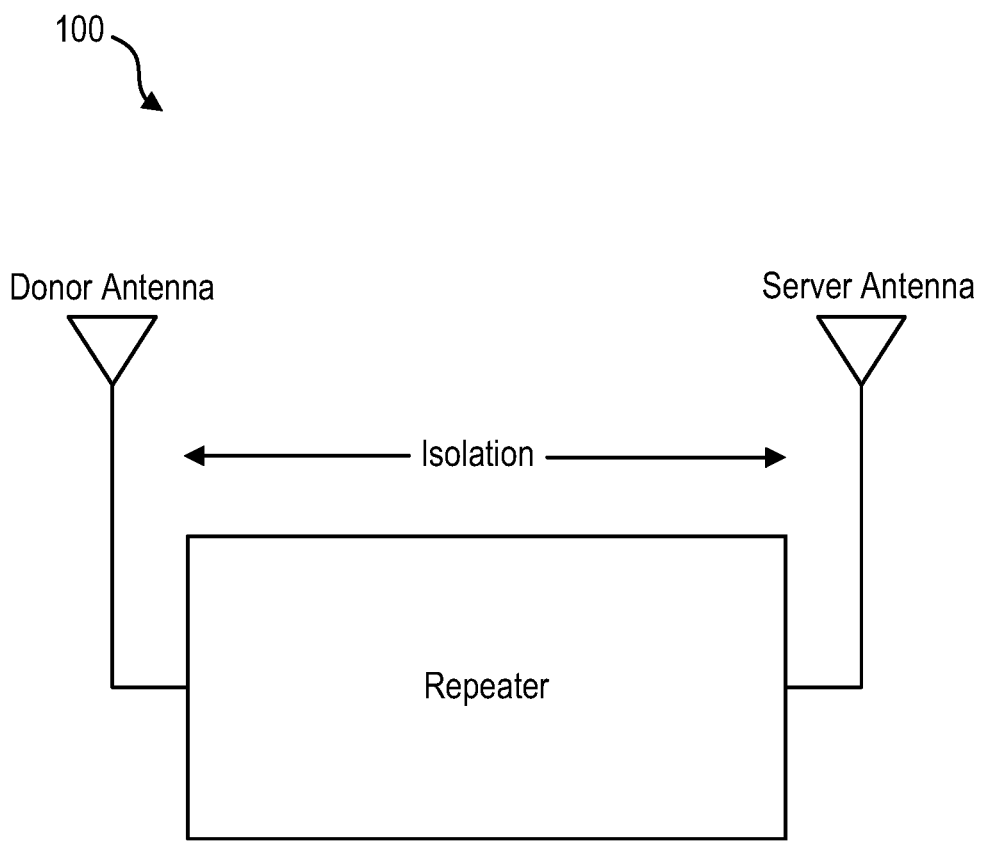
FIG. 1 is a diagram illustrating a repeater having a donor antenna and a server antenna.
Figure 2:
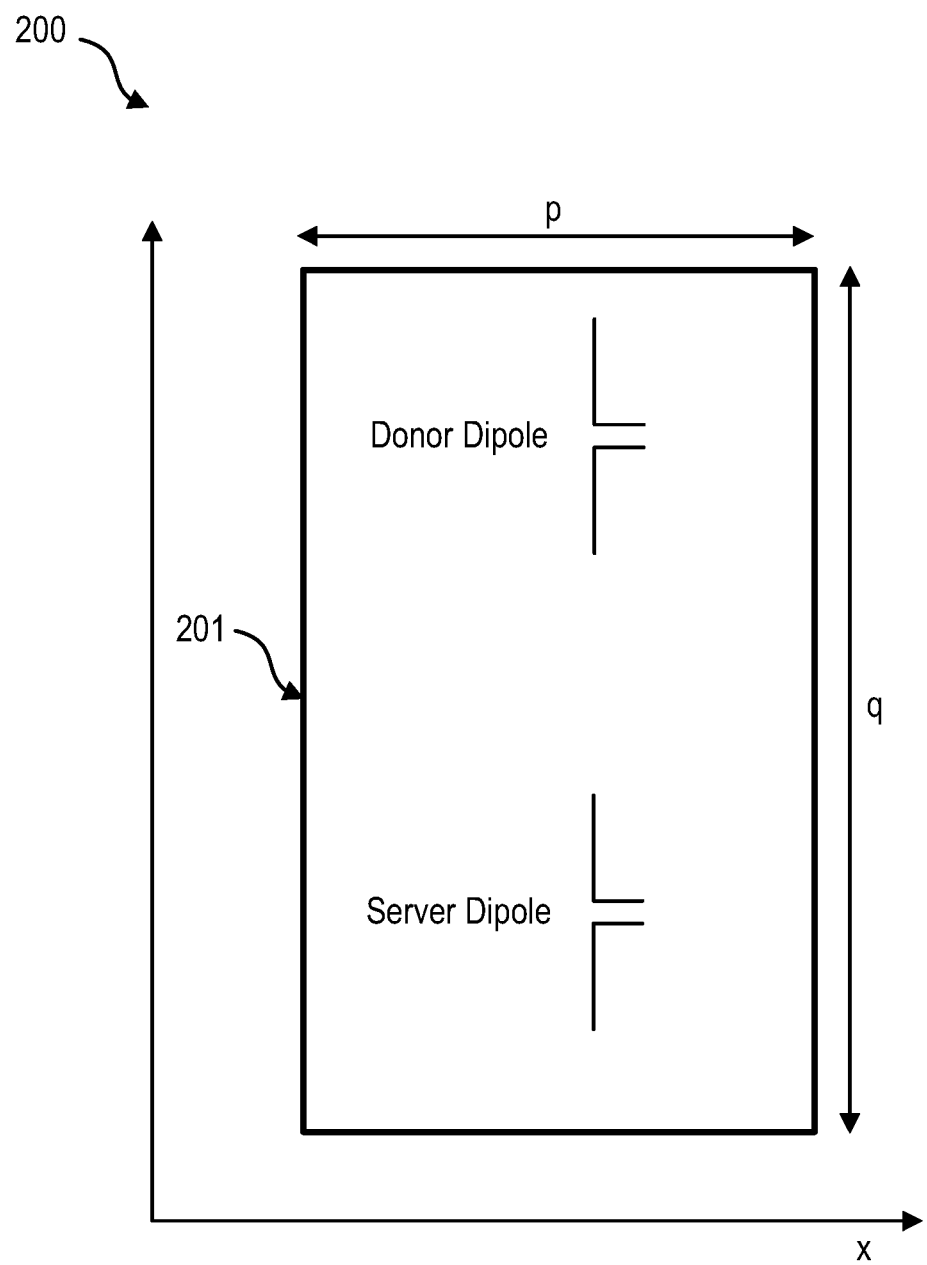
FIG. 2 is a diagram illustrating isolation between a donor antenna and a server antenna.

The current subject matter provides a departure from the traditional design approach and form factor for a repeater with integrated donor and server antenna. The basic principle is to maximize the isolation between the donor antenna and the server antenna by placing the server antenna in a physical location where the donor antenna has a transmission null and/or vice-versa. One example of such an antenna arrangement is illustrated in diagram 200 of FIG. 2. In this arrangement, the donor and server antennas are both dipole antennas. Dipole antennas have nulls in the radiation pattern in the y direction as shown in FIG. 2. Therefore, in an ideal world, the isolation between the donor and server antennas shown below is infinite. Of course, under practical conditions the isolation would not be infinite.

Figure 3:
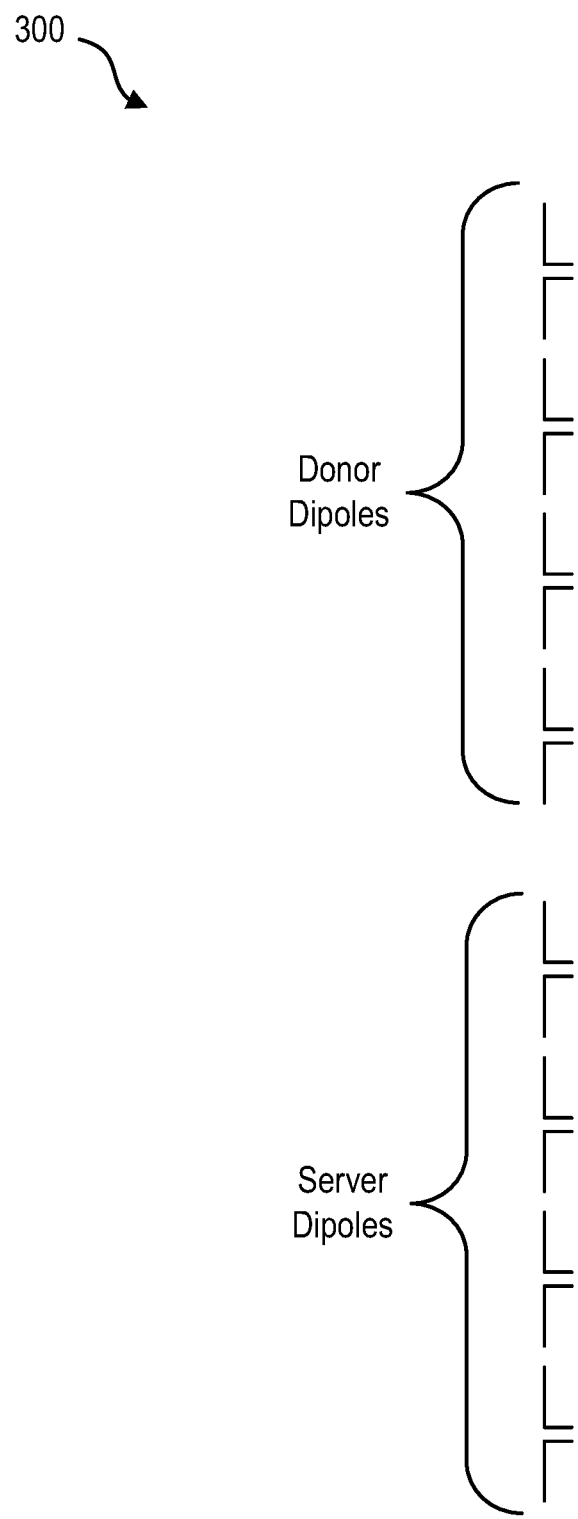
FIG. 3 is a diagram illustrating isolation among two donor antennas and two server antennas.

This current subject matter can also be applied to cover multi-band scenarios as well where the donor and server antennas are multiband antennas or, to the case where multiple donor and server antennas are used. An example of a physical antenna arrangement for a quad-band repeater is illustrated in diagram 300 of FIG. 3.

Figure 4:
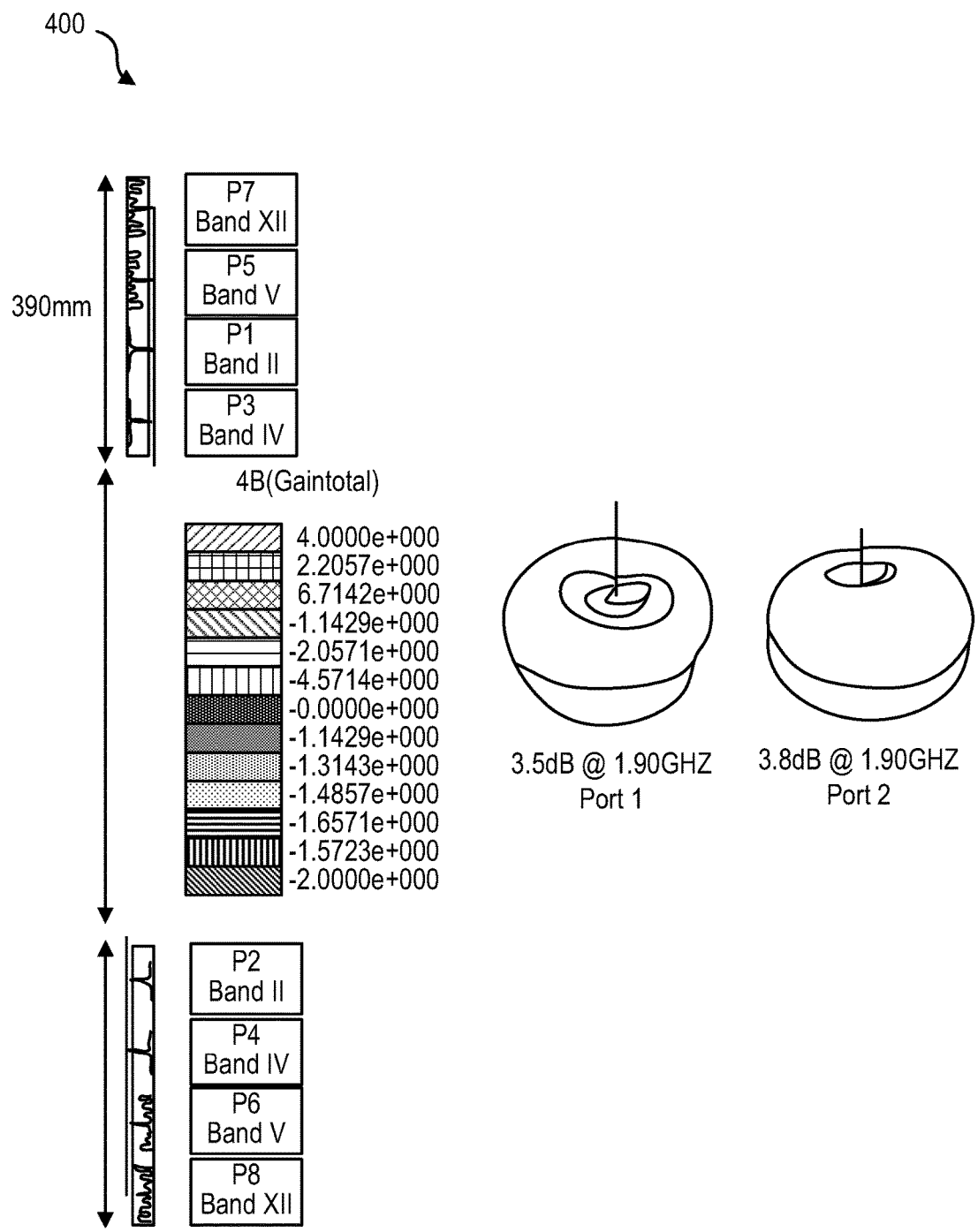
FIG. 4 is a diagram illustrating a radiation pattern for one donor/server pair of antennas within a repeater housing.

The radiation pattern for one donor/server pair of antennas within the repeater housing is illustrated in diagram 400 of FIG. 4. As can be seen, the nulls in the pattern in the z-direction are clearly visible. These nulls are aligned within the repeater housing leading to an increase in the isolation between the donor and server antennas.

In the examples shown, dipole antennas were used to illustrate the concept. However, any type of antenna may be used as a donor or server. The type of antenna used will define the location of the radiation nulls and hence the relative positioning of the antennas within the housing. For the dipole case shown, the resultant repeater will have a long tubular shape for example.

A second issue to consider when optimizing the isolation between the donor and the server is the polarization of the antennas. In addition to placing the antennas in the position of a relative null, the antennas can be designed with orthogonal polarization. This will increase the isolation and also make the design more robust against reduction in isolation due to scattering from nearby objects such as walls. For example, the donor antennas could be vertically polarized and the server antenna could be horizontally polarized.

Figure 5:
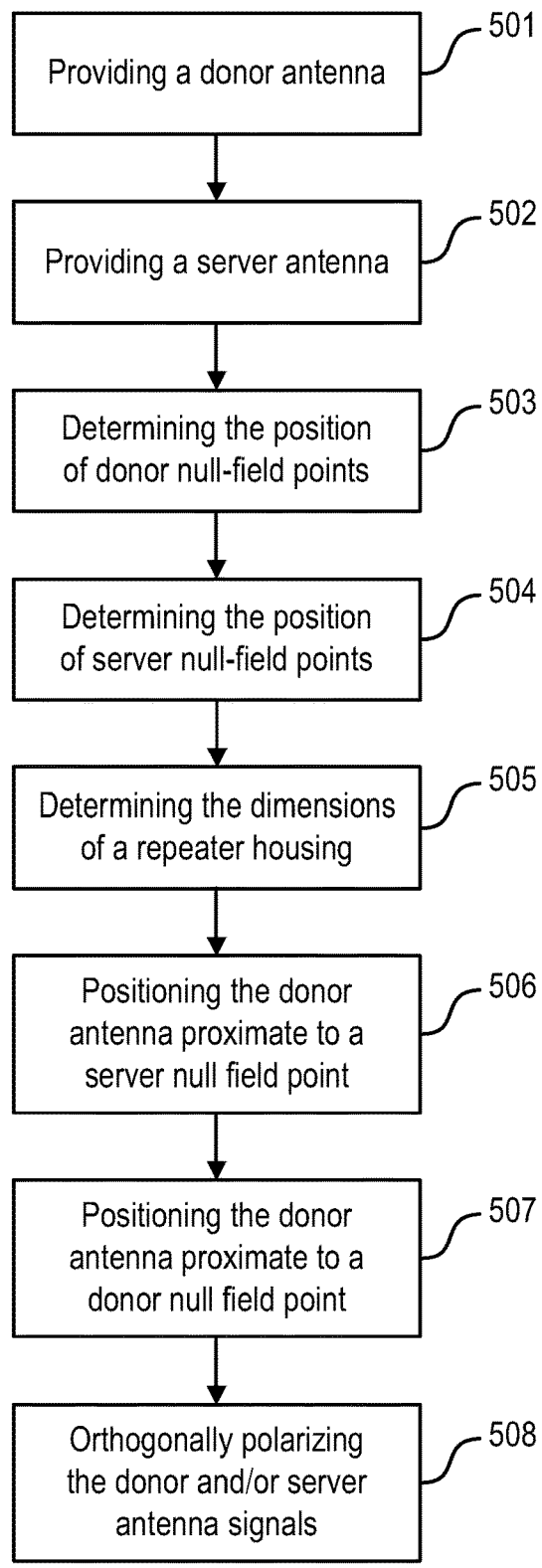
FIG. 5 illustrates a method of configuring an integrated repeater in accordance with one or more aspects of the presently disclosed subject matter.

FIG. 5 illustrates a method 500 for of configuring an integrated repeater in accordance with one or more aspects of the presently disclosed subject matter. The operations described herein with respect to method 500 may be performed by one or more of the elements described herein. Certain ones of the operations of method 500 may be performed by human action, computer hardware, computer software, computer firmware and/or by other methods. The operations illustrated in FIG. 5 are illustrative only. In some variations, one or more operations may be omitted from the method 500. In some variations, one or more additional and/or alternative operations may be included in method 500.

At 501, a donor antenna may be provided. The donor antenna may be configured to transmit and/or receive a wireless signal from a base station. The donor antenna may emit a signal having one or more null-field points. In some implementations a plurality of donor antennas may be provided. The one or more donor antennas may be dipole antennas, multiband antennas, or other form of antenna.

At 502, a server antenna may be provided. The server antenna may be configured to transmit and/or receive a wireless signal from one or more wireless devices. The server antenna may emit a signal having one or more null-field points. In some implementations, a plurality of server antennas may be provided. The one or more server antennas may be dipole antennas, multiband antennas, or other form of antenna.

At 503, the position of at least one of the one or more null-field points of the signal emitted from the donor antenna may be determined.

At 504, the positon of at least one of the one or more null-field points of the signal emitted from the server antenna may be determined.

At 505, the dimensions of a repeater housing may be determined. The dimensions of the repeater housing may be based on a requirement that at least one of the positions of the one or more null-field points of the signal emitted by the donor antenna and at least one of the positions of the one or more null-field points of the signal emitted by the server antenna are within the repeater housing when the donor antenna and the server antenna are disposed in the repeater housing. In some implementations, the dimensions of the repeater housing may be determined based on having at least one of the one or more null-field points of the signals emitted from the donor antenna and/or the server antenna being aligned with the repeater housing. With reference to FIG. 2, the positions of at least one of the one or more null-field points of the donor antenna and/or the server antenna may be used to determine the dimensions of the repeater housing 201. FIG. 2 shows two dimensions, p and q, of the repeater housing 201. The positions of the one or more null-field points may be used to determine the third dimension of the repeater housing. In some implementation, the positions of the one or more null-field points associated with the donor antenna and/or associated with the server antenna may be utilized to determine a shape for the repeater housing. The repeater housing is shown in FIG. 2 as having a regular polygonal shape, however, this disclosure anticipates any shape of housing for the repeater, including irregular shapes.

At 506, the donor antenna may be positioned proximate to at least one of the one or more null-field points of the signal emitted from the server antenna.

At 507, the server antenna may be positioned proximate to at least one of the one or more null-field points of the signal emitted from the donor antenna.

At 508, the signals transmitted by the donor antenna and/or the server antenna may be orthogonally polarized. A plane a plane for the orthogonally polarized signals emitted by the server antenna may be selected. The plane selected may be one such that the plane of the orthogonally polarized signals emitted by the server antenna is orthogonal to the plane for the orthogonally polarized signals emitted by the donor antenna.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. An integrated repeater comprising:
    a housing;
    a donor antenna positioned within the housing, the donor antenna being configured to transmit and/or receive a wireless signal from a base station, the donor antenna emitting a transmission pattern in a transmission field, the transmission pattern having one or more null-field points in the transmission field, at least one of the one or more null-field points being directed toward the housing; and,
    a server antenna positioned within the housing and physically separated from the donor antenna, the server antenna being configured to transmit and/or receive a wireless signal from one or more wireless devices, the server antenna being positioned proximate to a location within the housing of the at least one of the one or more null-field points of the transmission pattern from the donor antenna, the position of the server antenna facilitating signal isolation between the server antenna and the donor antenna.

2. The integrated repeater as in claim 1, further comprising:
    a plurality of donor antennas within the housing, the plurality of donor antennas emitting one or more transmission patterns in the transmission field that have a plurality of null-field points within the housing, and;
    a plurality of server antennas within the repeater housing, at least one of the plurality of server antennas being disposed proximate at least one of the plurality of null-field points within the housing.

3. The integrated repeater as in claim 1, wherein the donor antenna is a dipole antenna.

4. The integrated repeater as in claim 1, wherein the server antenna is a dipole antenna.

5. The integrated repeater as in claim 1, wherein the donor antenna is a multiband antenna.

6. The integrated repeater as in claim 1, wherein the server antenna is a multiband antenna.

7. The integrated repeater as in claim 1, wherein at least one of the one or more null-field points of the signals emitted from the donor antenna and/or the server antenna are aligned with the housing.

8. The integrated repeater as in claim 1, wherein the signals transmitted by the donor antenna and/or the server antenna are orthogonally polarized.

9. The integrated repeater as in claim 8, wherein the orthogonally polarized signals transmitted by the donor antenna are orthogonal to the orthogonally polarized signals transmitted by the server antenna.

10. A method of configuring an integrated repeater, the method comprising:
providing a donor antenna configured to transmit and/or receive a wireless signal from a base station, the donor antenna emitting a signal in a first transmission pattern having one or more null-field points, at least one of the one or more null-field points of the signal being emitted from the donor antenna and being directed into a housing that houses the donor antenna;
providing a server antenna configured to transmit and/or receive a wireless signal from one or more wireless devices, the server antenna emitting a signal in a second transmission pattern having one or more null-field points, at least one of the one or more null-field points of the signal emitted from the server antenna being directed into the housing;
determining a position of the at least one of the one or more null-field points of the signal emitted from the donor antenna;
determining a positon of the at least one of the one or more null-field points of the signal emitted from the server antenna;
positioning the donor antenna within a repeater housing proximate to the position of at least one of the one or more null-field points of the signal emitted from the server antenna; and
positioning the server antenna within the repeater housing proximate to the position of at least one of the one or more null-field points of the signal emitted from the donor antenna, the positioning facilitating isolation between the server antenna and the donor antenna.

11. The method as in claim 10, further comprising:
determining dimensions of the housing based on at least one of the positions of the one or more null-field points of the signal emitted by the donor antenna and at least one of the positions of the one or more null-field points of the signal emitted by the server antenna being within the housing when the donor antenna and the server antenna are in the housing.

12. The method as in claim 10, further comprising:
providing a plurality of donor antennas that emit one or more transmission fields having a plurality of null-field points within the housing, and;
providing a plurality of server antennas where individual ones of the plurality of server antennas are disposed proximate to individual ones of the plurality of null-field points.

13. The method as in claim 10, wherein the donor antenna is a dipole antenna.

14. The method as in claim 10, wherein the server antenna is a dipole antenna.

15. The method as in claim 10, wherein the donor antenna is a multiband antenna.

16. The method as in claim 10, wherein the server antenna is a multiband antenna.

17. The method as in claim 10, wherein the dimensions of the housing are determined based on having at least one of the one or more null-field points of the signals emitted from the donor antenna and/or the server antenna being aligned with the repeater housing.

18. The method as in claim 10, further comprising:
orthogonally polarizing the signals transmitted by the donor antenna and/or the server antenna.

19. The method as in claim 18, further comprising:
selecting a plane for the orthogonally polarized signals emitted by the server antenna such that the plane of the orthogonally polarized signals emitted by the server antenna is orthogonal to the plane for the orthogonally polarized signals emitted by the donor antenna.

* * * * *